May 7, 1957

L. SAIVES 2,791,454

SEPARABLE BALL-AND-SOCKET JOINT

Filed Feb. 10, 1953

United States Patent Office 2,791,454
Patented May 7, 1957

2,791,454

SEPARABLE BALL-AND-SOCKET JOINT

Léon Saives, Billancourt, France, assignor to Regie Nationale des Usines Renault, Billancourt, France Application February 10, 1953, Serial No. 336,189

Claims priority, application France March 28, 1952

1 Claim. (Cl. 287—85)

It is known to provide ball-and-socket joints which are made in such a way as to allow for instantaneous dismantling in which the entrance to the female part forming the socket is provided with a resilient ring or equivalent resilient member, which does not allow the passage of the male part without a certain amount of force, which causes the enlargement of the resilient ring, the latter thereafter closing again due to its resilience and holding the ball in place in the socket. The ball passes the resilient ring in the same way for entering when assembling or leaving when dismantling the linkage with which the ball and resilient ring are associated.

The present invention relates to a separable ball-and-socket joint, the socket of which is made of conventional thermoplastic material and does not comprise a separate resilient ring, and in which the entrance is slightly smaller than the male part, so that engaging and disengaging can only be achieved by applying a certain amount of force, due to the resilience of the socket.

The invention also relates to a process for the injection moulding of a socket in thermoplastic material comprising an entrance diameter $d$ less than the diameter $d_1$ of the cylindrical, cylindro-conical, bi-conical or spherical part, constituting the socket proper, according to which the core of the mould corresponding to the said part is not detachable in several parts but can be withdrawn after moulding through the aperture having a diameter slightly smaller than its maximum diameter, taking advantage of the elasticity of the thermoplastic material used.

A specific embodiment of the invention will now be described, by way of example, with reference to the accompanying drawings, in which.

Figure 1:
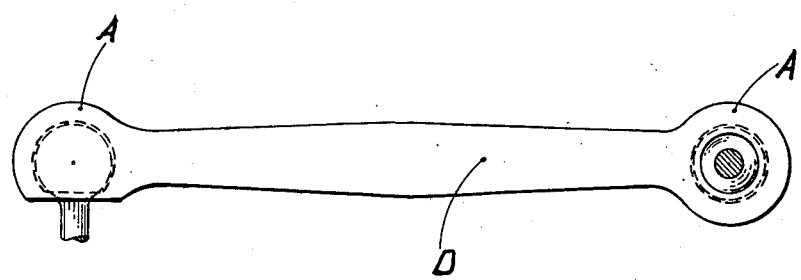
Figure 1 shows a connecting-rod comprising, at its extremities, sockets in accordance with the invention.
Figure 2:
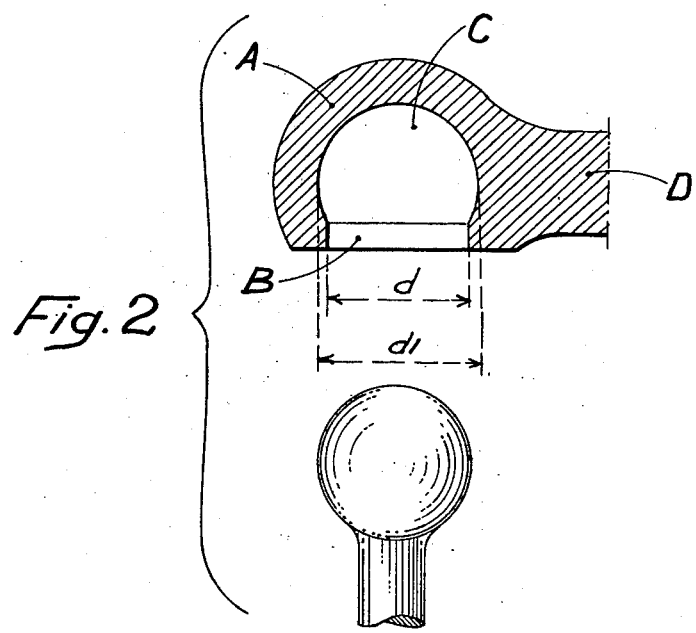
Figure 2 is a section of a socket on an enlarged scale.

As already stated, the socket A is made of a thermoplastic material and does not comprise a separate resilient ring. The entrance B to the socket A has a diameter $d$ slightly smaller than that of the male part, so that the insertion or removal of the latter necessitates a certain amount of force, and there is no danger of its occurring during the normal operation of the joint. On the other hand, the part C of the socket, which is cylindrical, cylindro-conical, bi-conical or spherical in shape, and encloses the ball when the joint is engaged, has a diameter $d_1$ equal to or slightly greater than that of the male member, in order to allow the joint the desired freedom of rotation.

In one embodiment, the socket, which is in one piece, may be attached by any means to the member, for example, a rod or connecting-rod, to which it is to be rigidly secured.

In a second embodiment, the whole member to which the socket should be rigidly secured, for example a connecting-rod or link D, having a socket A at each end, is in one piece and can be obtained completely finished by injection moulding.

I claim:

A link joint comprising a ball member and a link member, said link member being formed entirely of thermoplastic material and having a socket portion molded therein, said socket portion having a resilient entrance opening with a diameter slightly less than the diameter of said ball member inserted therein to form the link joint and having a spherical body cavity having a diameter slightly greater than the diameter of said ball member, whereby said ball member is inserted in said cavity by pressure sufficient to expand said resilient entrance opening of said socket portion to a diameter corresponding to that of the ball member to seat said ball member loosely in said cavity to provide a freely swiveling ball and link joint, the ball member having a shank of less diameter than said resilient entrance opening thereby providing free relative lateral pivotal movement between the members.

References Cited in the file of this patent

UNITED STATES PATENTS

| 667,630 | Kratz-Boussac | Feb. 5, 1901 |
| 703,899 | Debes | July 1, 1902 |
| 807,664 | Debes | Dec. 19, 1905 |
| 1,801,613 | Ratzer | Apr. 21, 1931 |
| 1,902,667 | Sanders | Mar. 21, 1933 |
| 1,916,692 | Scribner | July 4, 1933 |
| 2,025,030 | Ford | Dec. 24, 1935 |
| 2,466,278 | Rupert | Apr. 5, 1949 |
| 2,649,806 | Monaghan | Aug. 25, 1953 |

FOREIGN PATENTS

| 560,427 | Great Britain | Apr. 4, 1944 |